(12) United States Patent
Nakamasu et al.

(10) Patent No.: US 7,973,443 B2
(45) Date of Patent: Jul. 5, 2011

(54) MAGNETIC FIELD ELEMENT

(75) Inventors: Shin Nakamasu, Shiga (JP); Toshinari Kondou, Shiga (JP); Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 128 days.

(21) Appl. No.: 12/305,178

(22) PCT Filed: May 24, 2007

(86) PCT No.: PCT/JP2007/060612
§ 371 (c)(1),
(2), (4) Date: Dec. 16, 2008

(87) PCT Pub. No.: WO2008/007501
PCT Pub. Date: Jan. 17, 2008

(65) Prior Publication Data
US 2009/0273252 A1 Nov. 5, 2009

(30) Foreign Application Priority Data

Jul. 14, 2006 (JP) ................................ 2006-193909

(51) Int. Cl.
*H02K 1/27* (2006.01)

(52) U.S. Cl. ............... 310/156.62; 310/156.64; 310/268

(58) Field of Classification Search ............. 310/156.08, 310/156.31, 156.33, 156.38, 156.48–156.56, 310/156.62–156.65, 216.066–216.067, 266–268; 335/285, 291, 295, 304, 306
See application file for complete search history.

(56) References Cited

U.S. PATENT DOCUMENTS

| | | | | |
|---|---|---|---|---|
| 3,762,042 A | * | 10/1973 | Abe et al. | 29/598 |
| 4,996,457 A | * | 2/1991 | Hawsey et al. | 310/268 |
| 5,642,009 A | * | 6/1997 | McCleer et al. | 310/156.35 |
| 6,232,696 B1 | | 5/2001 | Kim et al. | |
| 6,373,162 B1 | * | 4/2002 | Liang et al. | 310/156.53 |
| 6,717,324 B2 | * | 4/2004 | Chen | 310/268 |
| 7,315,102 B2 | * | 1/2008 | Minagawa | 310/156.32 |
| 2005/0179337 A1 | * | 8/2005 | Hasebe et al. | 310/268 |
| 2006/0284507 A1 | * | 12/2006 | Murakami | 310/156.37 |

FOREIGN PATENT DOCUMENTS

| | | |
|---|---|---|
| JP | 58-108766 U | 7/1983 |
| JP | 2-262863 A | 10/1990 |
| JP | 10-174399 A | 6/1998 |

(Continued)

OTHER PUBLICATIONS

Australian Office Action issued Jul. 22, 2010 for Australian Application No. 2007273704.

(Continued)

*Primary Examiner* — Tran N Nguyen
(74) *Attorney, Agent, or Firm* — Birch, Stewart, Kolasch & Birch, LLP

(57) ABSTRACT

A magnetic field element includes magnetic field portions and a coupling portion and is rotatable on a rotation axis along a given direction. Each magnetic field portion includes a magnet and magnetic plates. The magnet includes first and second pole faces having different polarities from each other in the given direction. The magnetic-material plates are provided on the first and second pole faces. The magnetic field portions are annularly arranged along a circumferential direction around the rotation axis and spaced in the circumferential direction from one another. The coupling portion is made of a non-magnetic material and couples the magnetic field portions to one another.

14 Claims, 12 Drawing Sheets

FOREIGN PATENT DOCUMENTS

| | | |
|---|---|---|
| JP | 11-69680 A | 3/1999 |
| JP | 2929602 B2 | 5/1999 |
| JP | 2000-60066 A | 2/2000 |
| JP | 2001-46285 A | 2/2001 |
| JP | 2001-136721 A | 5/2001 |
| JP | 2005-143276 A | 6/2005 |
| JP | 2005-295757 A | 10/2005 |
| JP | 2006-14399 A | 1/2006 |
| JP | 2006-174553 A | 6/2006 |

OTHER PUBLICATIONS

Korean Office Action issued Jul. 14, 2010 for Korean Application No. 10-2008-7031123.

* cited by examiner

MAGNETIC FIELD ELEMENT

TECHNICAL FIELD

The present invention relates to a magnetic field element which is applicable to axial air-gap type rotary electric machines.

BACKGROUND ART

Axial air-gap type rotary electric machines include magnetic field elements and armatures, and they are desirable in terms of their reduced thickness and in terms of improved torque density with increased pole-face areas.

Although thrust forces are generated in the axial air-gap rotary electric machines, installing two magnetic field elements on mutually opposite sides of one armature or installing two armatures on mutually opposite sides of one magnetic field element, for example, will cancel out such thrust forces generated in the rotary electric machines.

In particular, installing two armatures per magnetic field element is desirable, This is because only one magnetic field element, which is usually adopted as a rotator, can reduce windage losses.

Patent documents 1 and 2 disclose rotary electric machines that include two armatures per magnetic field element. A magnetic field element disclosed in patent document 1 includes a plurality of magnets each having two pole faces having different polarities from each other, one of the pole faces facing one armature and the other of the pole faces facing the other armature. A magnetic field element disclosed in patent document 2 includes magnets on its end faces, one of the end faces facing one armature and the other of the end faces facing the other armature. In addition, patent document 3 discloses a technique relevant to the present invention.

Patent document 1: Japanese Patent Application Laid-open No. 2001-136721
Patent document 2: Japanese Patent Application Laid-open No. 2005-295757
Patent document 3: Japanese Patent Application Laid-open No. 2005-143276

DISCLOSURE OF THE INVENTION

Problems to be Solved by the Invention

In either of the rotary electric machines in the patent documents 1 and 2 described above, the magnets facing the armatures are exposed in the gaps between the armatures and the magnetic field element. These magnets are thus susceptible to the demagnetizing field and can undesirably be demagnetized.

The invention has been made in view of the above circumstances, and it is an object thereof to prevent demagnetization of magnets.

Means for Solving the Problems

A first aspect of a magnetic field element of the invention includes a plurality of magnets (11) which are annularly arranged along a circumferential direction (93) around a rotation axis (92) along a given direction (91) and spaced in the circumferential direction from one another and each of which has first and second pole faces (11a, 11b) having different polarities from each other in the given direction; magnetic plates (21; 22) provided on at least either of the first and the second pole faces of each of the magnets; and a coupling portion (3) made of a non-magnetic material and coupling magnetic field portions (2) to one another, which magnetic field portions include the magnets and the magnetic plates on which the magnets are provided.

According to a second aspect of the magnetic field element of the invention, in the first aspect of the magnetic field element, the magnetic plates (21; 22) are provided in contact with the magnets (11).

According to a third aspect of the magnetic field element of the invention, in either the first or second aspect of the magnetic field element, a distance between each adjacent pair of the magnetic field portions (2) along the circumferential direction (93) is shorter than the thickness of the magnets of the magnetic field portions in the given direction (91).

According to a fourth aspect of the magnetic field element of the invention, in any one of the first to third aspects of the magnetic field elements, the coupling portion (3) is made of a non-magnetic metal.

According to a fifth aspect of the magnetic field element of the invention, in the fourth aspect of the magnetic field element, end faces (2a; 2b) of the magnetic field portions (2) for the given direction (91) protrude relative to the coupling portion (3).

According to a sixth aspect of the magnetic field element of the invention, in the first to third aspects of the magnetic field elements, the coupling portion (3) is made of a non-magnetic non-metal.

According to a seventh aspect of the magnetic field element of the invention, in any one of the first to sixth aspects of the magnetic field elements, the magnetic plates (21; 22) are made of an iron-dust core.

According to an eighth aspect of the magnetic field element of the invention, in any one of the first to seventh aspects of the magnetic field elements, ends (111) of the magnets (11) on the outer side protrude to the outer side relative to ends (211; 221) of the magnetic plates (21; 22) on the outer side.

According to a ninth aspect of the magnetic field element of the invention, in any one of the first to eighth aspects of the magnetic field elements, ends (112) of the magnets (11) on the inner side protrude to the inner side relative to ends (212; 222) of the magnetic plates (21; 22) on the inner side.

According to a tenth aspect of the magnetic field element of the invention, in any one of the first to seventh aspects of the magnetic field elements, ends (211; 221) of the magnetic plates (21; 22) on the outer side protrude to the outer side relative to ends (111) of the magnets (11) on the outer side.

According to an eleventh aspect of the magnetic field element of the invention, in any one of the first to seventh and tenth aspects of the magnetic field elements, ends (212; 222) of the magnetic plates (21; 22) on the inner side protrude to the inner side relative to ends (112) of the magnets (11) on the inner side.

According to a twelfth aspect of the magnetic field element of the invention, in any one of the first to seventh aspects, the magnets (11) cover at least parts of the outer sides (211; 221) or inner sides (212; 222) of the magnetic plates (21; 22) provided on the magnets.

According to a thirteenth aspect of the magnetic field element of the invention, in any one of the first to twelfth aspects of the magnetic field elements, the coupling portion (3) couples the outer sides of the magnetic field portions (2) to one another, end faces (211; 221) of the magnetic plates (21; 22) on the outer sides are such that at least their portions (211a; 221a) on the side opposite to the magnets (11) on which the magnetic plates are provided recede inwardly relative to their portions on the side closer to the magnet; and the coupling portion covers at least parts of the receding portions.

According to a fourteenth aspect of the magnetic field element of the invention, in any one of the first to thirteenth aspects of the magnetic field elements, the coupling portion (3) couples the inner sides of the magnetic field portions (2) to one another; end faces (212; 222) of the magnetic plates (21; 22) on the inner sides are such that at least their portions (212a; 222a) on the side opposite to the magnets (11) on which the magnetic plates are provided recede inwardly relative to their portions on the side closer to the magnet; and the coupling portion covers at least parts of the receding portions.

According to a fifteenth aspect of the magnetic field element of the invention, in any one of the first to fourteenth aspects of the magnetic field elements, the magnetic plates (21, 22) are provided on both the first and second pole faces (11a, 11b).

According to a sixteenth aspect of the magnetic field element of the invention, in the fifteenth aspect of the magnetic field element, the magnetic plates (21, 22) provided on the first and the second pole faces (11a, 11b) of one of the magnets (11) are coupled to each other on the outer side and the inner side of the magnet.

According to a seventeenth aspect of the magnetic field element of the invention, any one of the first to sixteenth aspects of the magnetic field elements further includes a magnetic core (5) spaced from and between each adjacent pair of the magnetic field portions (2) along the circumferential direction and held by the coupling portion (3).

EFFECTS OF THE INVENTION

According to the first aspect of the magnetic field element of the invention, the provision of the magnetic plates on the pole faces of the magnets makes the magnetic field element less susceptible to the demagnetizing fields from the sides where the magnetic plates are provided, thus preventing demagnetization of the magnets. In addition, the coupling of the magnetic field portions with the coupling portion of a non-magnetic material will reduce the occurrence of a short circuit in the magnetic flux among the magnetic field portions.

According to the second aspect of the magnetic field element of the invention, an increased permeance coefficient causes the operating point to shift to higher permeance values. This more efficiently prevents demagnetization of the magnets.

According to the third aspect of the magnetic field element of the invention, demagnetization of the magnets is more efficiently prevented.

According to the fourth aspect of the magnetic field element of the invention, the coupling portion has high strength.

According to the fifth aspect of the magnetic field element of the invention, eddy-current losses are unlikely to occur in the coupling portion.

According to the sixth aspect of the magnetic field element of the invention, no eddy-current loss occur in the coupling portion.

According to the seventh aspect of the magnetic field element of the invention, eddy-current losses are unlikely to occur in the magnetic plates.

According to the eighth aspect of the magnetic field element of the invention, since the magnetic flux of the pole faces on which the magnetic plates are provided tends to flow into the magnetic plates with low magnetic reluctance, it is unlikely that the magnetic flux passes through the end of one magnet on the outer side between the pole faces of the magnet and is thereby short-circuited.

According to the ninth aspect of magnetic field element of the invention, since the magnetic flux at the pole faces on which the magnetic plates are provided tends to flow into the magnetic plates, it is unlikely that the magnetic flux passes through the inner end of one magnet between the pole faces of the magnet and is thereby short-circuited.

According to the tenth or eleventh aspect of the magnetic field element of the invention, out of the faces of the magnetic field element to the given direction, those that are opposite to the armatures have increased pole-face areas. Besides, at least parts of the end faces of the protruding portions of the magnetic plates on the side opposite to the magnets are covered with, for example, end plates of a non-magnetic material fixed to the coupling portion, so that the magnetic field portions are fixed to the coupling portion.

According to the twelfth aspect of the magnetic field element of the invention, the magnetic plates are fixed to the magnets by fitting the magnetic plates into the magnets. Besides, the fixation of the magnetic plates in contact with the magnets is allowed to increase the permeance coefficient and accordingly the operating point shifts to higher permeance side. This more efficiently prevents demagnetization of the magnets.

According to the thirteenth or fourteenth aspect of the magnetic field element of the invention, the magnetic plates are fixed to the magnets with the coupling portion.

According to the fifteenth aspect of the magnetic field element of the invention, the magnetic field element is less susceptible to the demagnetizing fields from both the given direction and the direction opposite to the given direction. This further reduces demagnetization of the magnets.

According to the sixteenth aspect of the magnetic field element of the invention, the magnets are easy to hold with the magnetic plates.

According to the seventeenth aspect of the magnetic field element of the invention, the provision of the magnet cores will increase q-axis inductance. Increasing the q-axis inductance higher than d-axis inductance can cause the generation of reluctance torque.

These and other objects, features, aspects and advantages of the present invention will become more apparent from the following detailed description of the present invention when taken in conjunction with the accompanying drawings.

BEST MODE FOR CARRYING OUT THE INVENTION

First Preferred Embodiment

Figure 1:
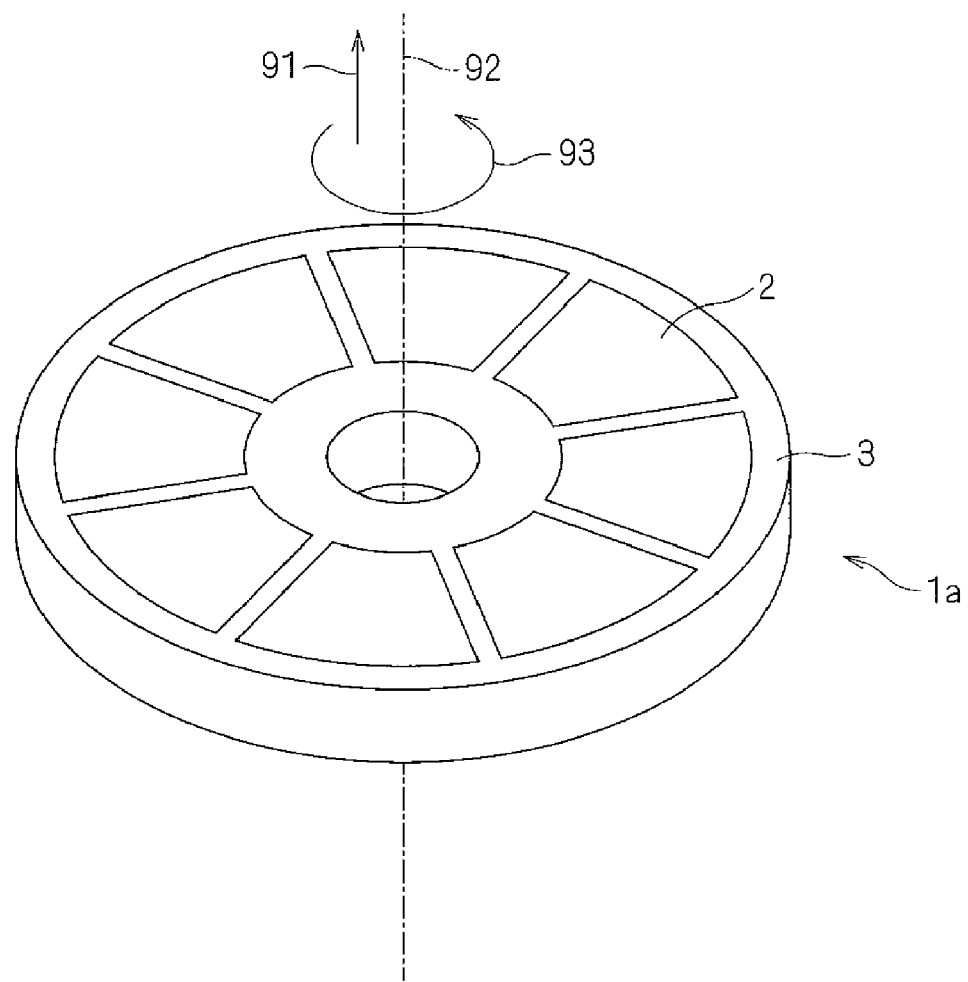
FIG. 1 is a perspective view schematically showing a magnetic field element 1a described in a first preferred embodiment.
Figure 2:
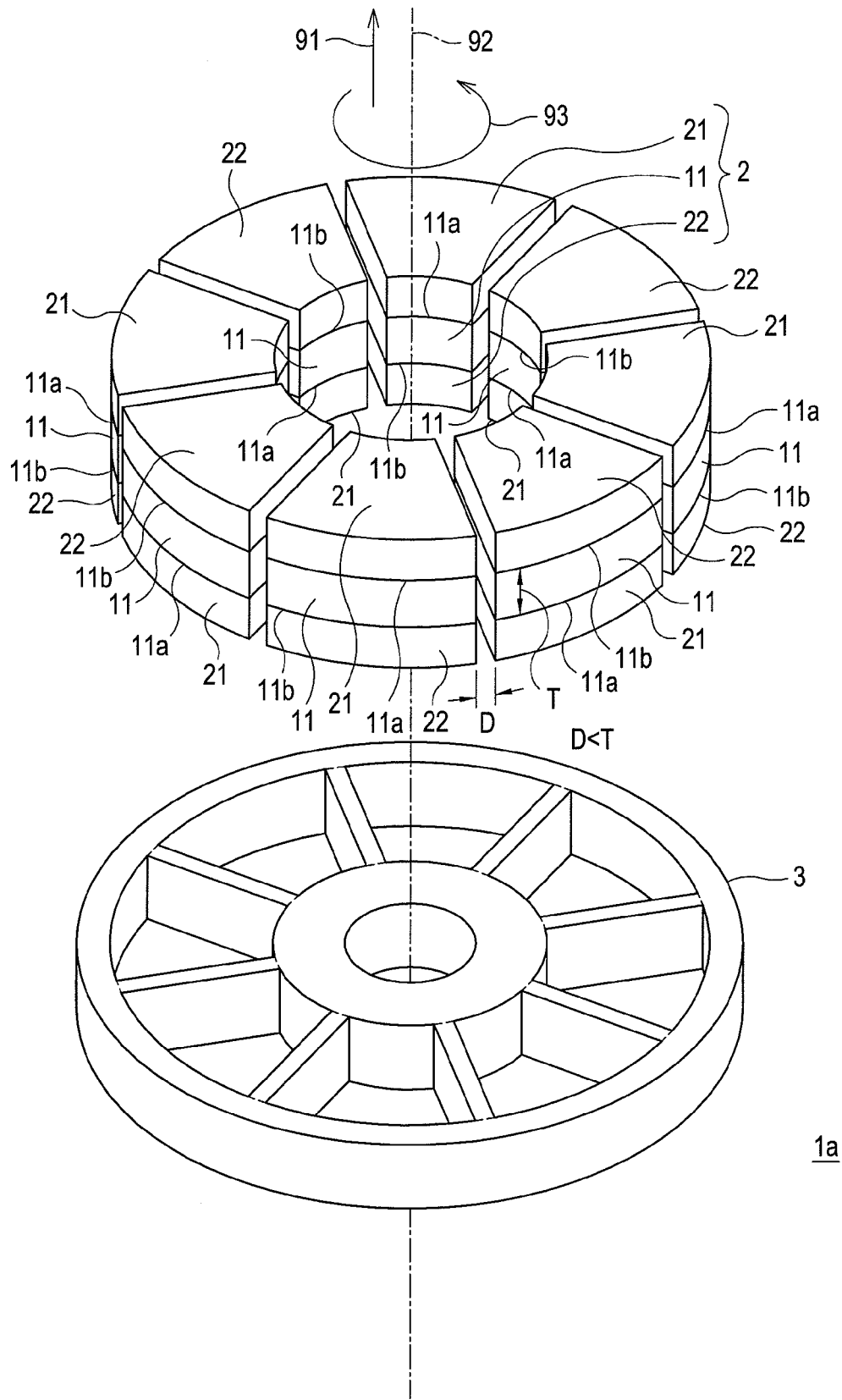
FIG. 2 is a view showing the magnetic field element 1a exploded along a rotation axis.

FIGS. 1 and 2 both schematically show the same magnetic field element 1a according to the present preferred embodiment. The magnetic field element 1a includes magnetic field portions 2 and a coupling portion 3 and is rotatable upon a rotation axis 92 along a given direction 91. In FIG. 2, the magnetic field portions 2 and the coupling portion 3 are shown exploded along the rotation axis 92.

Each magnetic field portion 2 includes a magnet 11 and magnetic plates 21 and 22. Each magnet 11 has first and second pole faces 11a and 11b having different polarities from each other in the given direction 91. For instance, the first pole face 11a has an N polarity, and the second pole face 11b has an S polarity.

The magnets 11 should desirably be sintered rare-earth magnets. This is because of increased magnetic flux density. In this case, although eddy-current losses are likely to occur in the rare-earth magnets, using a magnetic material with lower electric conductivity than the rare-earth magnets for the magnetic plates 21 and 22 described later will reduce the occurrence of eddy-current losses.

The magnetic plates 21 and 22 are provided on the first and second pole faces 11a and 11b, respectively. At this time, the magnetic plates 21 and 22 can be fixed to the magnets 11 with an adhesive or the like.

Since, in this case, the magnetic reluctance will increase in the vicinity of the pole faces 11a and 11b by the amount of an adhesive, there is apprehension that reduced permeance coefficient may deteriorate magnetic properties. Thus, an adhesive should desirably be made of a magnetic material. This is because adhesives of magnetic materials can compensate for deterioration of magnetic properties due to reduced thicknesses of the magnetic plates 21 and 22.

For instance, the magnetic plates 21 and 22 and the magnets 11 may be fixed to the coupling portion 3 with an adhesive at their ends 211, 221, and 111 on the outer side, respectively, or at their ends 212, 222, and 112 on the inner side, respectively. This eliminates the need to apply an adhesive between the magnetic plates 21, 22 and the magnets 11, thus preventing an increase in the magnetic reluctance in the vicinity of the pole faces 11a and 11b.

The magnetic plates 21 and 22 should desirably be a dust core, in particular an iron-dust core, with magnetic isotropy. This is because of reduced occurrence of eddy-current losses in the magnetic plates 21 and 22. Since the magnetic field element 1a rotates in synchronization with current flowing through armatures, many of iron losses occurring in the magnetic field element 1a are eddy-current losses.

The magnetic field portions 2 are annularly arranged along a circumferential direction 93 around the rotation axis 92 and are spaced in the circumferential direction 93 from one another. When viewing the magnets 11 at this time, the magnets 11 also are annularly arranged along the circumferential direction 93 around the rotation axis 92.

Referring in particular to FIG. 2, each adjacent pair of the magnets 11 along the circumferential direction 93 exhibit different polarities from each other in the given direction 91. In other words, when one of each adjacent pair of the magnets 11 aims its first pole face 11a to the given direction 91, the other one of the pair of the magnets 11 aims its second pole face 11b to the same direction. The same can be said of the opposite direction to the given direction 91. It is however to be noted that the present invention is not limited thereto.

The coupling portion 3 is made of a non-magnetic material and couples the magnetic field portions 2 to one another. The non-magnetic material may be a non-metal such as a resin or a metal such as aluminum. The use of a non-metal will prevent the occurrence of eddy-current losses in the coupling portion 3. On the other hand, the use of a metal will improve the strength of the coupling portion 3.

In the magnetic field element 1a described above, the provision of the magnetic plates 21 and 22 on the pole faces 11a and 11b of the magnets 11 makes the magnets 11 less susceptible to the demagnetizing fields from the sides where the magnetic plates 21 and 22 are provided. This prevents demagnetization of the magnets 11. In addition, the coupling of the magnetic field portions 2 with the coupling portion 3 of a non-magnetic material can reduce the occurrence of a short circuit in the magnetic flux among the magnetic field portions 2.

From the viewpoint of preventing demagnetization of the magnets 11, it is especially desirable that the distance between each adjacent pair of the magnetic field elements 2 along the circumferential direction 93 be smaller than the thickness of the magnets 11 of the magnetic field portions 2 in the given direction 91. However, from the viewpoint of preventing a short circuit in the magnetic flux, it is desirable, in a rotary electric machine provided with the magnetic field element 1a and armatures, that the above distance be more than two times greater than the distances between the magnetic field element 1a and the armatures.

FIGS. 3 to 6 schematically show the shapes of the magnet 11 and the magnetic plates 21 and 22 of each magnetic field portion 2. FIGS. 3 to 6 all show one magnetic field portion 2 viewed from the circumferential direction 93.

Figure 3:
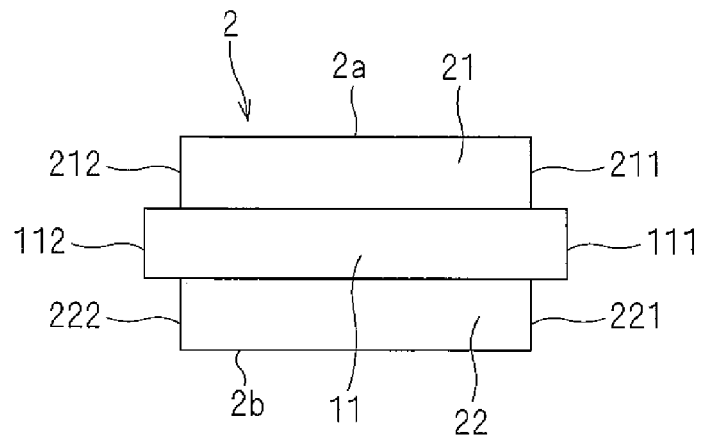
FIG. 3 to FIG. 7 are views schematically showing shapes of a magnet 11 and magnetic plates 21 and 22.

Referring to FIG. 3, an end 111 of the magnet 11 on the outer side protrudes to the outer side relative to outer ends 211 and 221 of the magnetic plates 21 and 22. This shape will increase the magnetic reluctance of a magnetic path along the end 111 of the magnet 11 on the outer side between the pole faces 11a and 11b thereof. Thus, the magnetic flux flowing into and out of the protruding portion of the magnet 11 is likely to flow into the magnetic plates 21 and 22 with low magnetic reluctance. In other words, it is unlikely that the magnetic flux will pass through the end 111 of one magnet 11 on the outer side between the pole faces 11a and 11b of that magnet and thereby will be short-circuited. This increases the density of the magnetic flux flowing into and out of end faces 2a and 2b of the magnetic field portion 2 for the given direction 91.

Referring further to FIG. 3, an end 112 of the magnet 11 on the inner side protrudes to the inner side relative to ends 212 and 222 of the magnetic plates 21 and 22 on the inner side. This shape, as in the case of the outer side of the magnet 11, makes the magnetic flux unlikely to be short-circuited, thus increasing the density of the magnetic flux flowing into and out of the end faces 2a and 2b of the magnetic field portion 2 for the given direction 91.

While FIG. 3 shows the case where the magnet 11 protrudes to both the inner and outer sides relative to the magnetic plates 21 and 22, it may protrude to only either side.

Since the magnet 11 of the magnetic field portion 2 protrudes to the outer or inner side relative to the magnetic plates 21 and 22, the end 111 or the end 112 of the magnet 11 can be fixed directly to the coupling portion 3. Thus, even if the forces of attraction are generated to the magnets 11 by providing the magnetic field element 1a with armatures and exerting the rotating magnetic fields of the armatures on the magnetic field portions 2, the magnets 11 fixed to the coupling portion 3 can counteract such forces of attraction generated to the magnets 11. Also, thrust forces generated to the magnetic plates 21 and 22 can be reduced.

Figure 4:
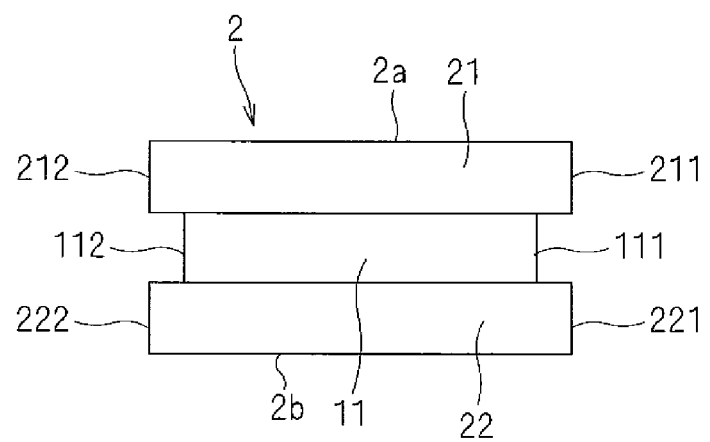

Referring to FIG. 4, the ends 211 and 221 of the magnetic plates 21 and 22 protrude to the outer side relative to the end 111 of the magnet 11. Also, the ends 212 and 222 of the magnetic plates 21 and 22 protrude to the inner side relative to the end 112 of the magnet 11. This shape will increase the pole-face area of the field magnet 1a.

While FIG. 4 shows the case where the magnetic plates 21 and 22 protrude to both the outer and inner sides relative to the magnet 11, they may protrude to only either side.

Figure 5:
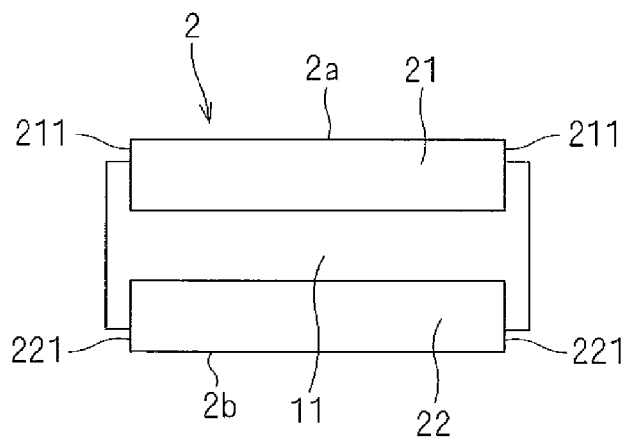

Referring to FIG. 5, the magnet 11 covers at least parts of the outer sides (the ends 211 and 221) or the inner sides (the ends 212 and 222) of the magnetic plates 21 and 22 provided on the magnet 11. In this shape, fitting the magnetic plates 21 and 22 into the magnet 11 provides fixation of the magnetic plates 21 and 22 to the magnet 11. In addition, the magnetic plates 21 and 22 are fixed in contact with the magnet 11, which increases the permeance coefficient and accordingly causes the operating point to shift to higher permeance values. This more efficiently prevents demagnetization of the magnet 11. The part of the magnets 11 that covers the ends 211, 221, 212, and 222 may be nonmagnetic.

In particular, when a bonded magnet is used as the magnet 11, it is easy to form the magnet 11 with the shape described above. Besides, with the magnetic plates 21 and 22 held on the magnet 11, the magnet 11 and the magnetic plates 21 and 22 are formed into one piece, thereby the magnet 11 and the magnetic plates 21 and 22 can be coupled to one another simultaneously with the formation of the magnet 11.

Figure 6:
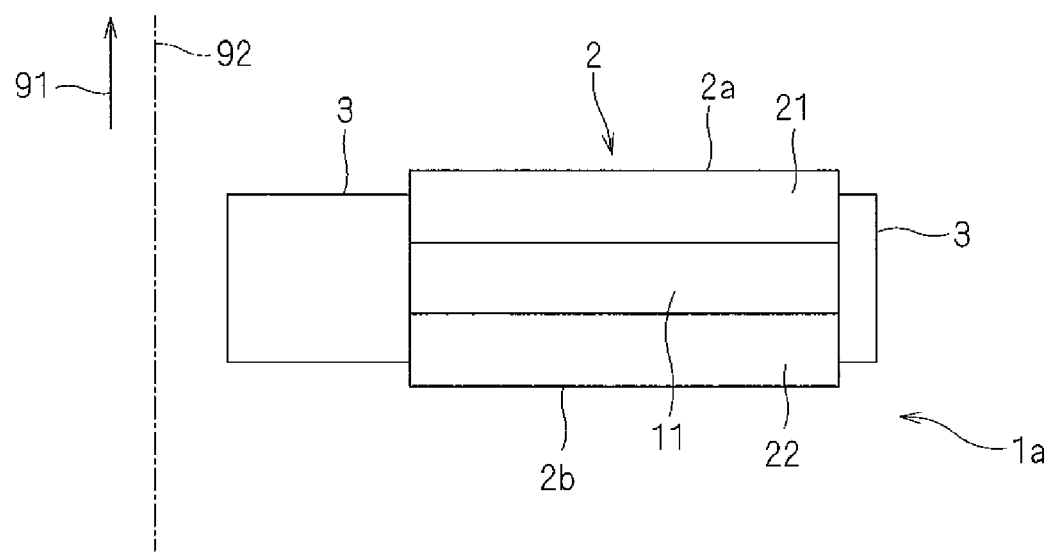

In either of the preferred embodiments described above, the end faces 2a and 2b of the magnetic field portions 2 for the given direction 91 should desirably protrude relative to the coupling portion 3 as shown in FIG. 6. This is because, when the magnetic field element 1a is provided with armatures, those armatures are in closer proximity to the end faces 2a and 2b than to the coupling portion 3 so that most of the magnetic fluxes generated in the armatures will flow into the magnetic plates 21 and 22. In other words, little magnetic flux will flow into the coupling portion 3. This will reduce the occurrence of eddy-current losses in the coupling portion 3, even if the coupling portion 3 is made of a non-magnetic metal.

To put the above in another way, the coupling portion 3 recede in the given direction 91 relative to the end faces 2a and 2b. In particular when the coupling portion 3 between each adjacent pair of the magnetic field portions 2 recedes relative to the end faces 2a and 2b, even if there is a magnetic flux flow between the end faces of the magnetic plates 21 and 22 for the circumferential direction 93 and the armatures, reduced magnetic flux will flow through the coupling portion 3 so that the eddy-current losses generated in the coupling portion 3 are small.

While, in any magnetic field element 1a described above, the magnetic plates 21 and 22 are provided respectively on the pole faces 11a and 11b of the magnets 11, only either one of the pole faces 11a and 11b may have the magnetic plates 21 and 22 provided thereon. For instance, out of a plurality of magnets 11, some of the magnets 11 may have the magnetic plates 21 provided only on their pole faces 11a, and the other of the magnets 11 may have the magnetic plates 22 provided only on their pole faces 11b.

It is however preferable that the magnetic plates 21 and 22 be provided on both the pole faces 11a and 11b of one magnet 11. This is because of less susceptibility of the magnetic field element 1a to the demagnetizing fields from both the given direction 91 and the direction opposite thereto, which further reduces demagnetization of the magnets 11.

Figure 7:
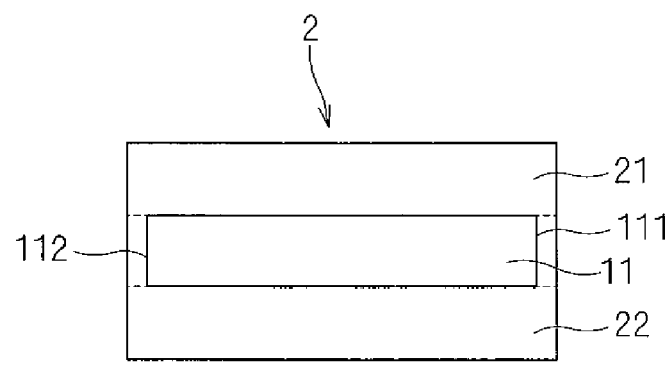

FIG. 7 shows another preferred embodiment of the magnetic field portions 2 in which both the pole faces 11a and 11b are provided with the magnetic plates 21 and 22. The magnetic plates 21 and 22 are coupled to each other on the outer side (the end 111) and the inner side (the end 112) of the magnet 11. This shape allows easy holding of the magnets 11 with the magnetic plates 21 and 22. Using an iron-dust core as the magnetic plates 21 and 22 is desirable from the viewpoint of easy formation of the magnetic field portion 2 with the above shape. It is also desirable that the coupled portions of the magnetic plates 21 and 22 have reduced thicknesses in the radial direction. This is because the magnetic flux is prevented from passing through those portions from one of the pole faces 11a and 11b of the magnet 11 to the other and thereby being short-circuited.

When the magnetic plates 21 and 22 are annularly located along the circumferential direction 93 on the side of the magnets 1 in the given direction 91 or on the side opposite thereto, the magnetic plates 21 and 22 on the same side should desirably be coupled to each other with a magnetic plate A (not shown) that is smaller in thickness than the magnetic plates 21 and 22. This is because of easy formation of the magnetic plates 21 and 22. Besides, the magnetic plate A with a smaller thickness can easily lead to saturation of the magnetic flux, so that the magnetic flux is unlikely to be short-circuited through the magnetic plates 21 and 22 between each adjacent pair of the magnets 11 along the circumferential direction 93.

Second Preferred Embodiment

Figure 8:
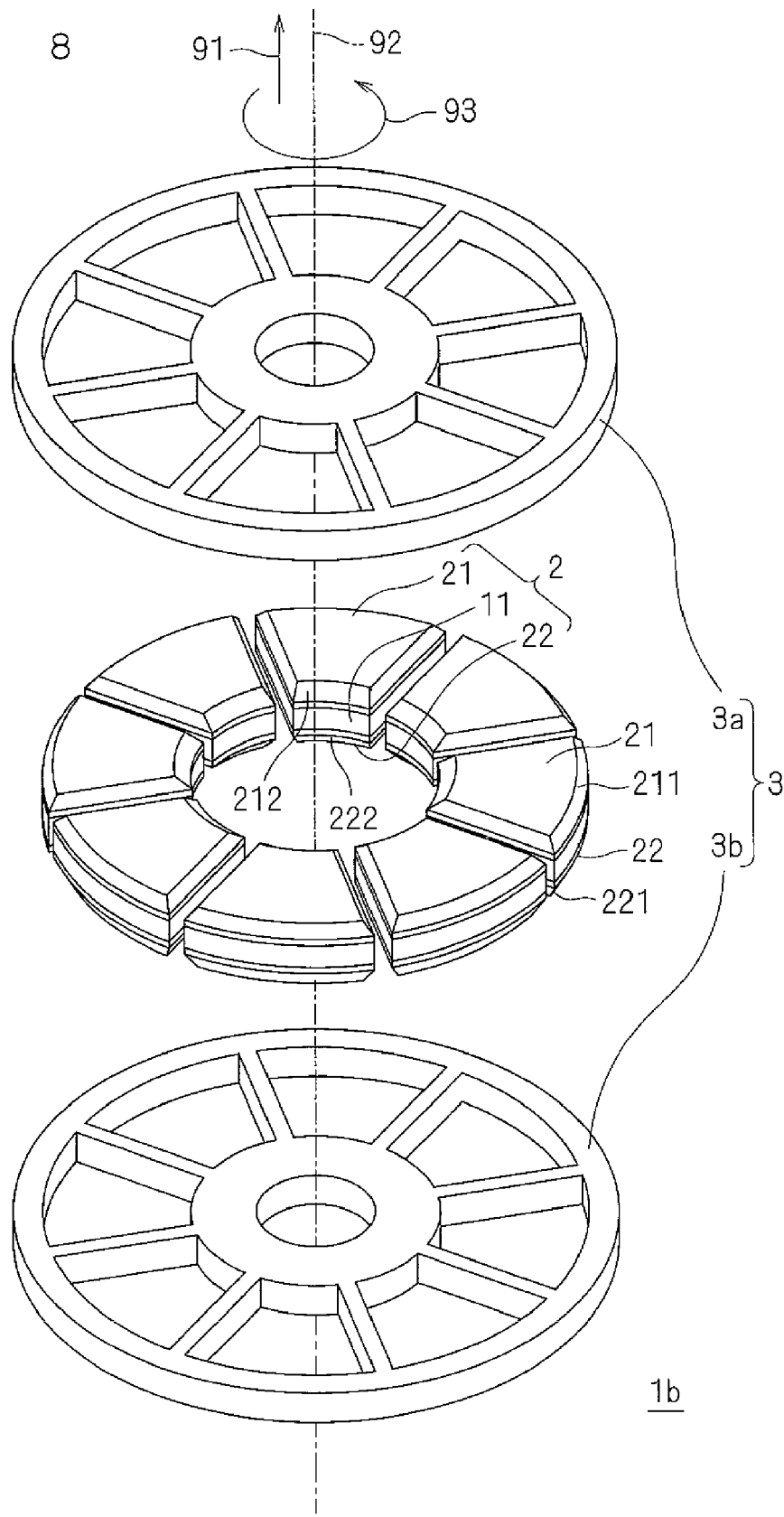
FIG. 8 is a perspective view schematically showing a magnetic field element 1b described in a second preferred embodiment.
Figure 10:
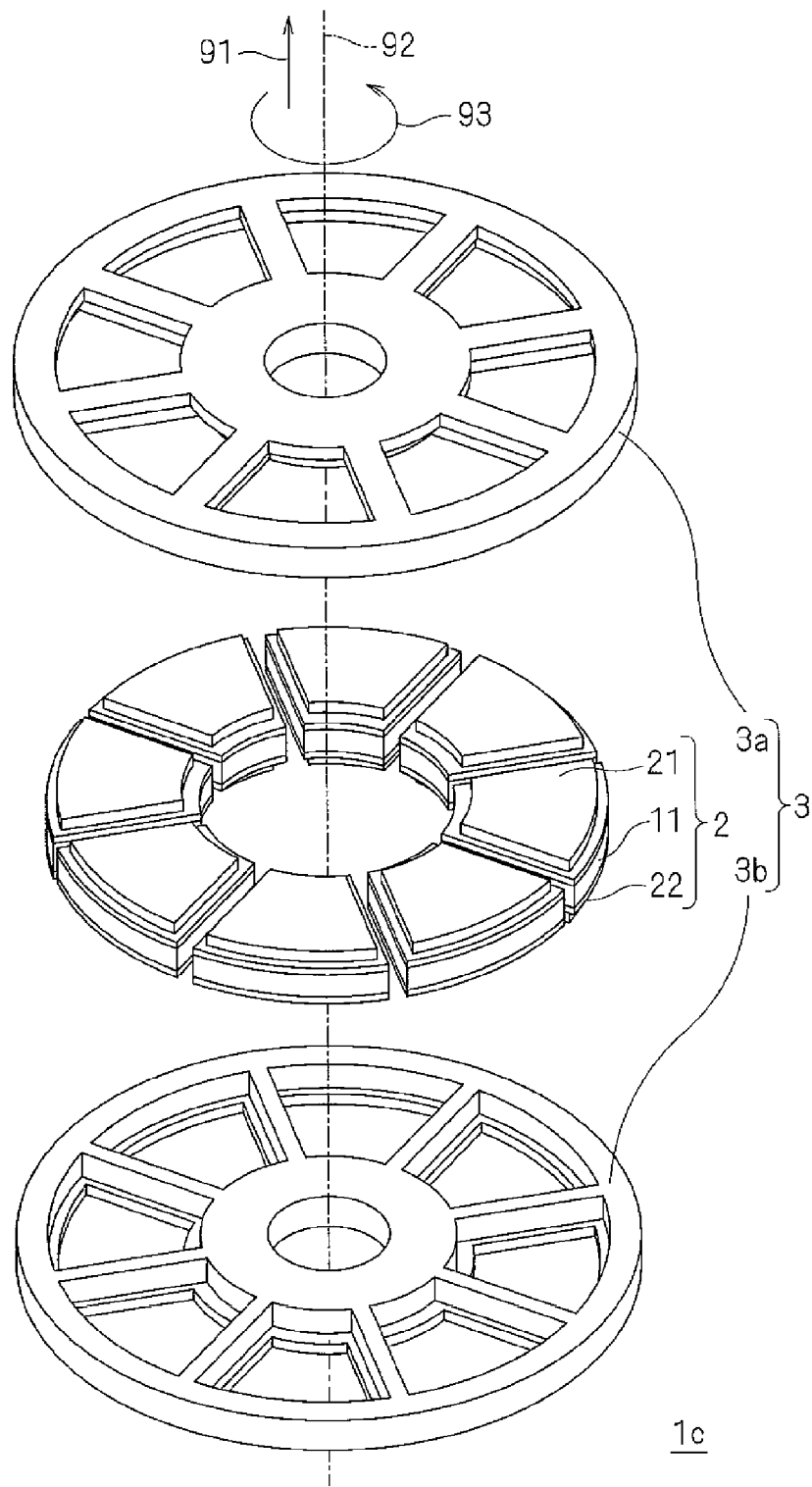
FIG. 10 is a perspective view schematically showing a magnetic field element 1c described in the second preferred embodiment.

FIGS. 8 and 10 schematically show, respectively, magnetic field elements 1b and 1c according to the present preferred embodiment. Like the magnetic field element 1a, the magnetic field elements 1b and 1e include the magnetic field portions 2 and the coupling portion 3. In FIGS. 8 and 10, the magnetic field portions 2 and the coupling portion 3 are shown exploded along the rotation axis 92. The following description is given of the differences from the magnetic field element 1a described in the first preferred embodiment. While the magnetic field portions 2 shown in FIGS. 8 and 10, in each of which both the pole faces 11a and 11b of one magnet 11 are provided with the magnetic plates 21 and 22, respectively, like the first preferred embodiment, are not limited thereto.

Figure 9:
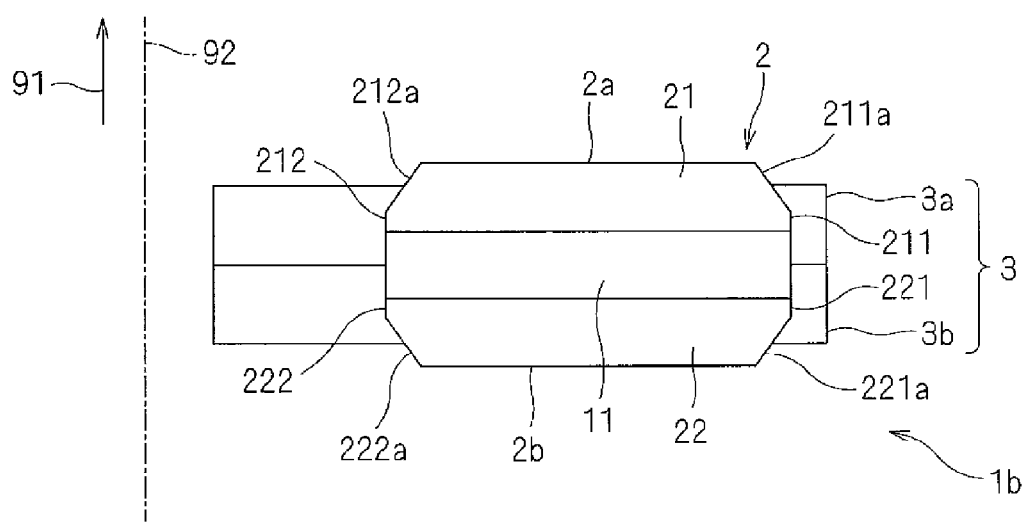
FIG. 9 is a view schematically showing the magnetic field element 1b in cross section taken along a circumferential direction 93.
Figure 11:
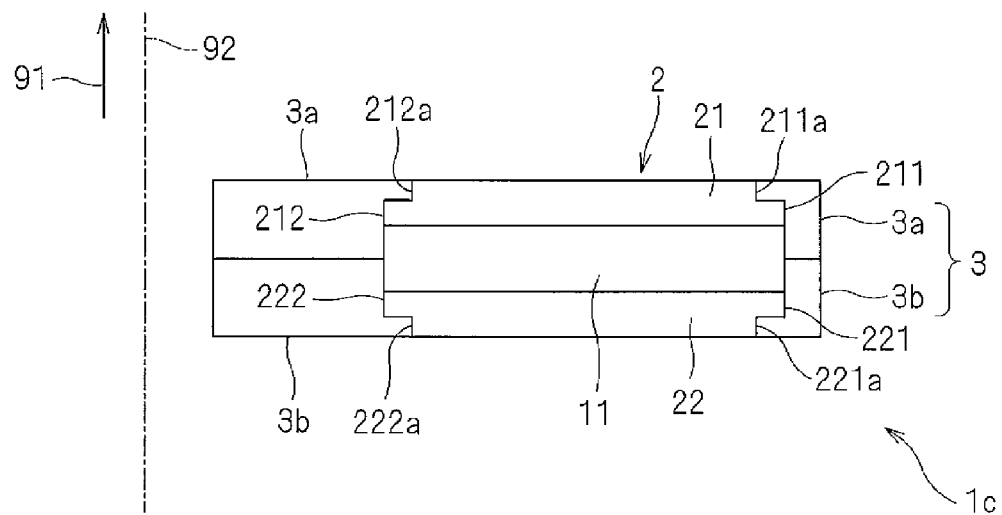
FIG. 11 and FIG. 12 are views schematically showing the magnetic field element 1c in cross section taken along the circumferential direction 93.

FIGS. 9 and 11 show the magnetic field elements 1b and 1c, respectively, in cross section taken along the circumferential direction 93. In either of the magnetic field elements 1b and 1c, when referring to the end faces 211 and 221 of the magnetic plates 21 and 22 on the outer side provided on one magnet 11, at least portions 211a and 221a on the sides opposite to the magnet 11 recede inwardly relative to the other portions 211 and 221 on the sides closer to the magnet 11.

The outer sides of the adjacent magnetic field portions 2 along the circumferential direction 93 are coupled to one another by the coupling portion 3. The coupling portion 3 covers at least parts of the portions 211a and 221a of the magnetic plates 21 and 22.

Referring in particular to FIG. 9, both the portions 211a and 221a recede further inwardly with increasing distance from the magnet 11. Further, the coupling portion 3 covers only parts of the portions 211a and 221a on the sides closer to the magnet 11.

Referring to FIG. 11, the portions 211a and 221a recede inwardly so that the end faces 211 and 221 have stair-like shapes. The coupling portion 3 then covers the entire portions 211a and 221a. Alternatively, the coupling portion 3 may cover only parts of the portions 211a and 221a.

Figure 12:
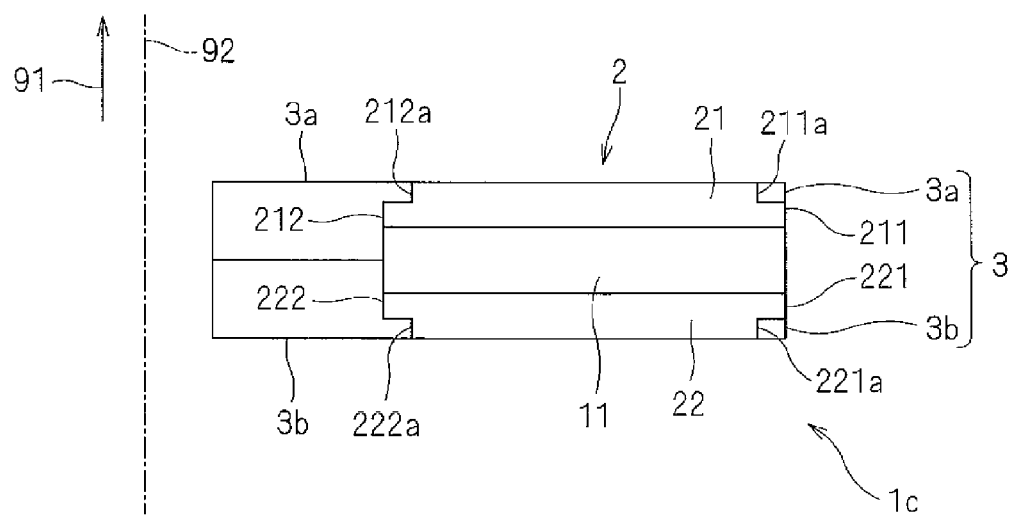

While FIG. 11 shows the case where the coupling portion 3 covers the entire outer side of the magnetic field portion 2, the coupling portion 3 may cover, for example, only the portions 211a and 221a as shown in FIG. 12.

This shape (hereinafter referred to as the "shape a") allows the magnetic plates 21 and 22 to be fixed to the magnet 11 with the coupling portion 3.

Besides, the magnetic plates 21 and 22 can be fixed in contact with the magnets 11, which increases the permeance coefficient and accordingly the operating point shifts to higher permeance side. This more efficiently prevents demagnetization of the magnet 11.

FIGS. 9 and 11 show the cases where the inner sides of the magnetic field portions 2 also have the same shape (hereinafter referred to as the "shape b") as the outer sides described above. When referring to end faces 212 and 222 of the magnetic plates 21 and 22 on the inner side provided on one magnet 11, portions 212a and 222a on the sides opposite to the magnet 11 recede outwardly to portions on the sides closer to the magnet 11. The inner sides of the adjacent magnetic field portions 2 along the circumferential direction 93 are coupled to one another by the coupling portion 3. The coupling portion 3 then covers at least parts of the portions 212a and 222a of the magnetic plates 21 and 22.

The magnetic field element 1b with both the shapes a and b facilitates the fixation of the magnetic plate 21 and 22 to the magnet 11 and also prevents demagnetization of the magnets 11. It also facilitates the positioning of the magnetic field portions 2 with respect to the given direction 91, thus allowing armatures to be aligned with high accuracy relative to the magnetic field element 1b. It goes without saying that the magnetic field element 1b may have only either of the shapes a and b.

Referring to FIG. 9, as in the first preferred embodiment (FIG. 6), the ends 2a and 2b of the magnetic field portions 2 protrude relative to the coupling portion 3, which will prevent the occurrence of eddy-current in the coupling portion 3.

From the viewpoint of manufacturing the magnetic field element 1b, it is desirable, as shown in FIGS. 9 and 11, that the coupling portion 3 be divided into two parts perpendicularly to the given direction 91. More specifically, the coupling portion 3 may include coupling parts 3a and 3b so that the magnetic field portions 2 are sandwiched from both sides by the coupling parts 3a and 3b.

Figure 13:
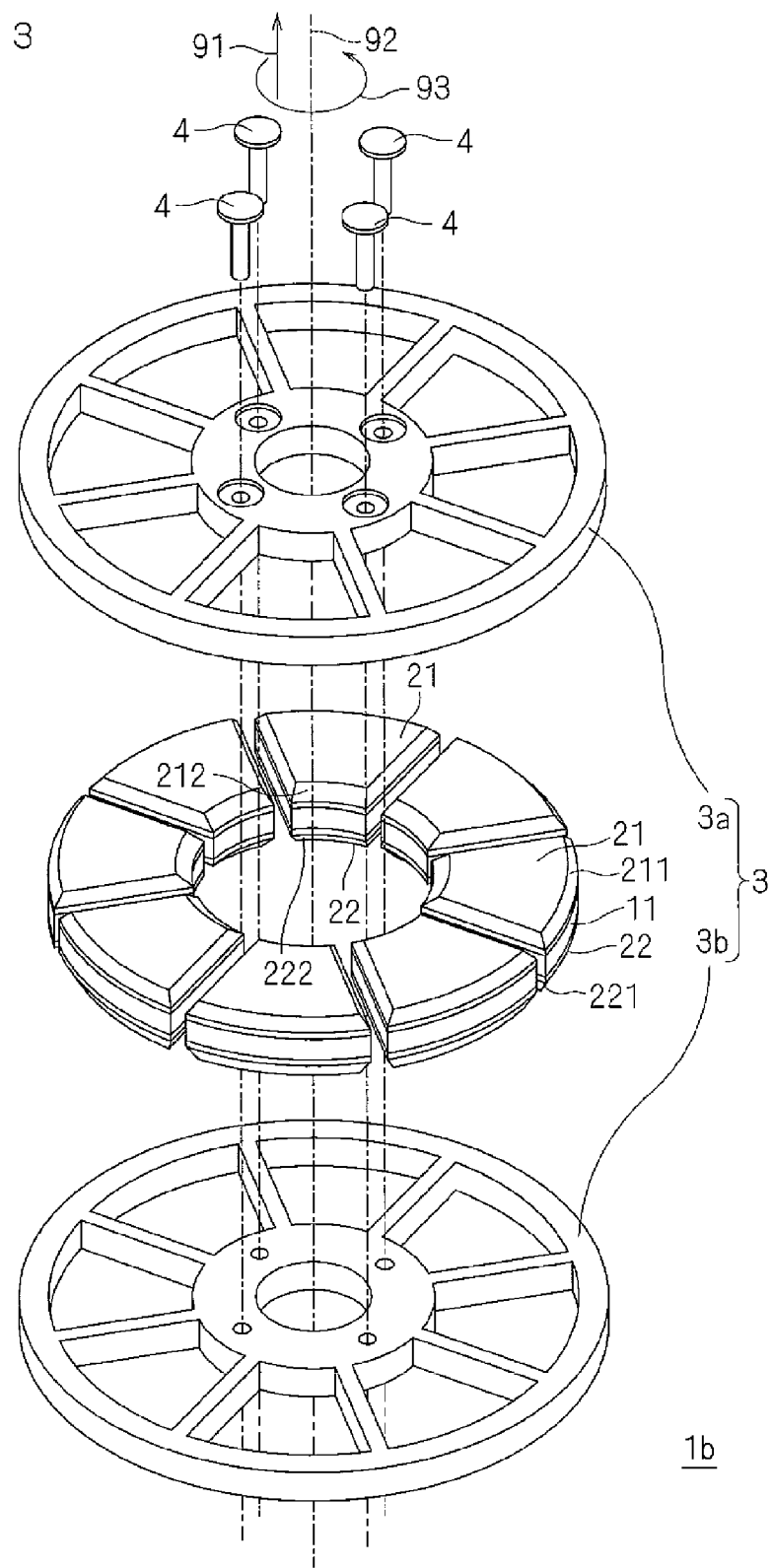
FIG. 13 is a view schematically showing a magnetic field element with its coupling portions coupled to each other with bolts.

The coupling parts 3a and 3b, for instance as shown in FIG. 13, are coupled to each other with bolts 4 (or pins). The bolts 4 should desirably be provided at the outer or inner positions of the magnetic field portions 2. This is because the provision of the bolts 4 at such positions will make a small magnetic impact. While FIG. 13 shows the case where the magnetic field element 1b in FIG. 8 is provided with the bolts 4, the magnetic field element 1c in FIG. 10 may also be provided with the bolts 4 in a similar fashion. The bolts 4 may be made of a magnetic material or a non-magnetic material. This is because, since the bolts 4 are magnetically spaced from the magnetic field portions 2 and do not face the armatures of an iron-dust core, no magnetic flux will flow through the bolts 4.

Third Preferred Embodiment

Figure 14:
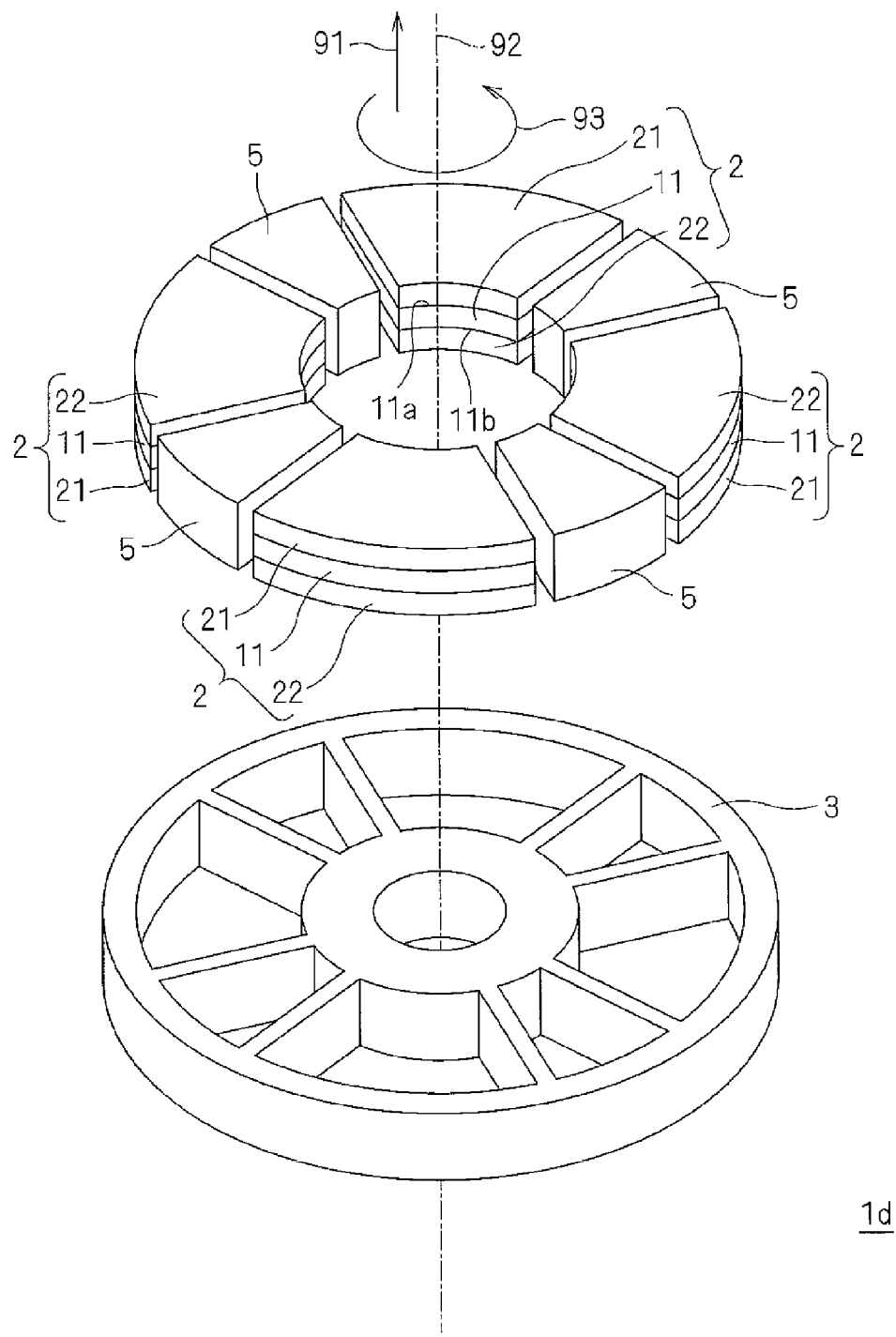
FIG. 14 is a perspective view schematically showing a magnetic field element 1d described in the second preferred embodiment.

FIG. 14 schematically shows a magnetic field element 1d according to the present preferred embodiment. The magnetic field element 1d includes the magnetic field portions 2, the coupling portion 3, and magnetic cores 5. The magnetic field portions 2 are configured in the same manner as described in the first preferred embodiment (FIG. 1, etc.)

The magnetic cores 5 are spaced from and between the adjacent magnetic field portions 2 along the circumferential direction 93. The magnetic cores 5 should desirably be an iron-dust core. This is because of reduced occurrence of eddy-current losses in the magnetic cores 5.

The magnetic cores 5 may be a lamination of electromagnetic steel plates. From the viewpoint of reducing iron losses, the magnetic cores 5 should desirably be electromagnetic steel plates laminated in the circumferential direction 93. Use of electromagnetic steel plates laminated in the given direction 91 is not preferable because magnetic fluxes will pass across the contact faces of the electromagnetic steel plates. The use of the electromagnetic steel plates laminated in the circumferential direction 93 allows the magnetic cores 5 to have approximately the same thickness in the radial direction.

The magnetic cores 5 may have the shape of a rectangle, a sector, or a trapezoid when viewed from the given direction 91.

The coupling portion 3 couples the magnetic field portions 2 to one another as in the first preferred embodiment, and it further holds the magnetic cores 5.

In the magnetic field element 1d now described, the provision of the magnet cores 5 increases q-axis inductance. Increasing the q-axis inductance higher than d-axis inductance results in the generation of reluctance torque.

When the magnetic field element id is provided with concentrated winding armatures and when the ratio of the number of poles of the magnetic field element to the number of armature windings is 2:3, the ratio between the magnets 11 or the magnetic plates 21, 22 and the magnetic cores 5 with respect to the angle around the rotation axis 92 should desirably be 2:1. This is because one pole of the armatures and the magnets 11 or the magnetic plates 21, 22 will have approximately the same angle around the rotation axis 92, so that the magnetic fluxes from the magnets 11 can link with the armatures with efficiency.

Increasing the cross-sectional areas of the magnetic cores 5 for the given direction 91 in close proximity to the center thereof in the given direction 91 allows easy holding of the magnetic cores 5 with the coupling portion 3. For instance, the end faces of the magnetic cores 5 on the outer or inner side or the end faces thereof for the circumferential direction 93 may be convex. In the case of using such magnetic cores 5, it is desirable in terms of easy manufacture that the coupling portion 3 be divided into two parts perpendicularly to the given direction 91.

In either of the preferred embodiments described above, the magnetic field elements 1a to 1d are fixed to a shaft that is rotatable on the rotation axis 92. The magnetic field portions 2 may be fixed directly to the shaft, but from the viewpoints of preventing a short circuit in the magnetic flux, ensuring strength, or the like, it is desirable that the magnetic field portions 2 be fixed to the shaft through the coupling portion 3.

Figure 15:
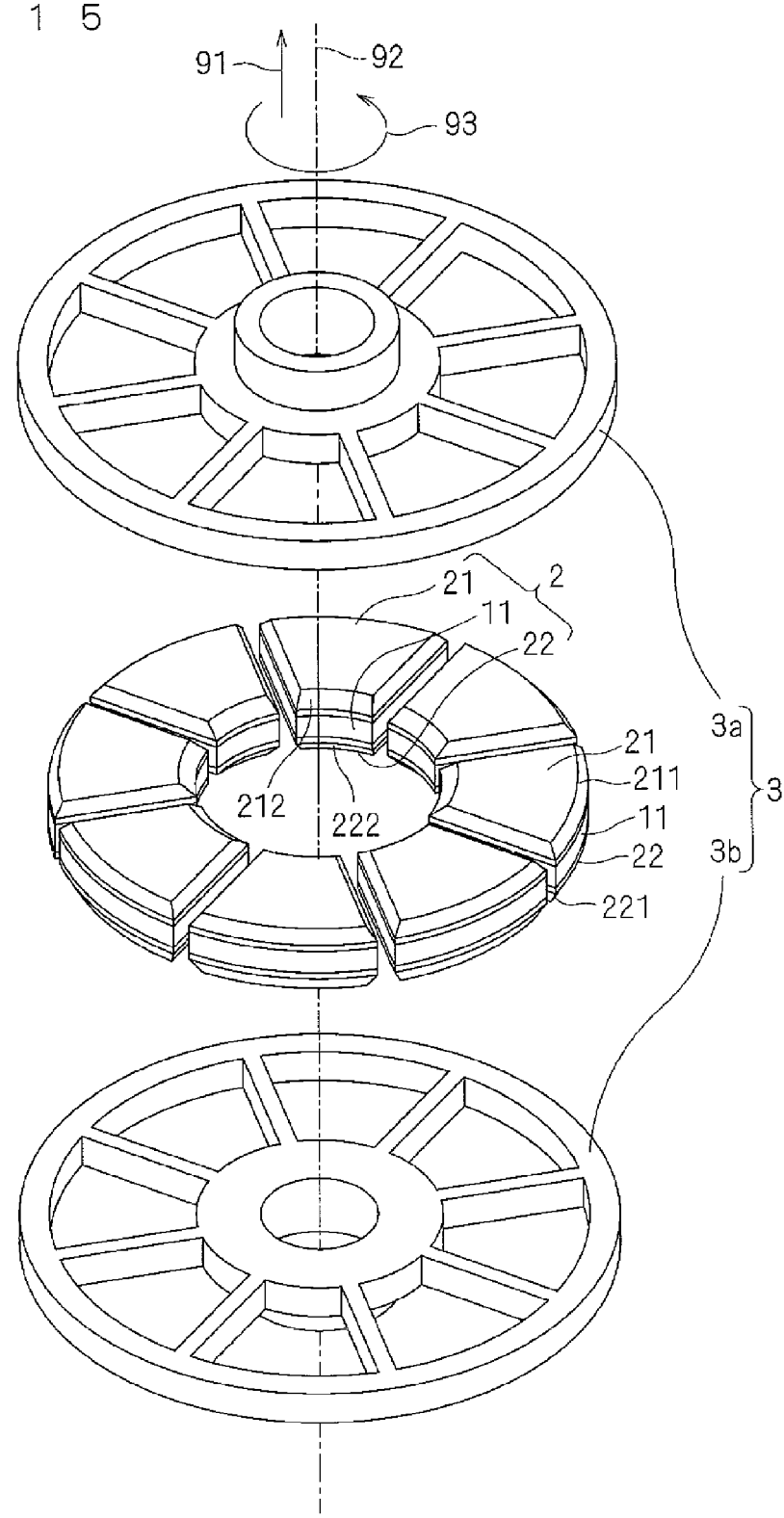
FIG. 15 is a view schematically showing a magnetic field element with its coupling portions 3 having a projecting portion around a shaft.

In particular, from the viewpoint of ensuring strength, it is desirable, in terms of increasing the contact area of the coupling portion 3 with the shaft, that the coupling portion 3 (which may be part of the coupling portion 3) on the inner sides of the magnetic field portions 2 protrude along the rotation axis 92 around the shaft. Such a shape is shown in FIG. 15.

Figure 16:
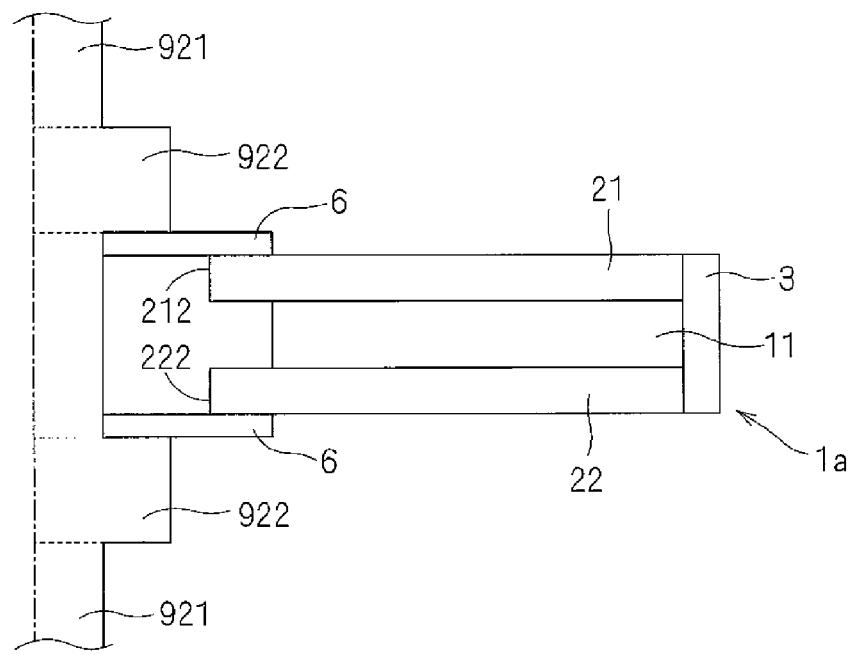
FIG. 16 and FIG. 17 are views schematically showing a magnetic field element with the magnetic plates 21 and 22 fixed with end plates.

In either of the preferred embodiments described above, the magnetic plates 21 may be fixed to the magnets 11 as shown in FIG. 16. In other words, the ends 212 of the magnetic plates 21 on the inner side may protrude to the inner side relative to the magnets 11. Then, end plates 6 formed in an annular shape along the circumferential direction 93 are provided on those protruding portions on the sides opposite to the magnets 11. The end plates 6 are made of a non-magnetic metal. The end plates 6 are pressed toward the magnets 11 with thick portions 922 of a shaft 921 provided on the end plates 6 on the sides opposite to the magnetic plates 21. For instance, the end plates 6 may be fixed to the shaft 921, or the end plates 6 may be fixed to the coupling portion 3 or the like with bolts.

Similarly, the magnetic plates 22 may be fixed to the magnets 11 with the end plates 6 (FIG. 16). While, in FIG. 16, the shaft 921 has the thick portions 922 on both sides of the magnetic field element 1a, it may have a thick portion 922 only on either one side. In this case, the magnetic field element 1a can be installed at a position where the magnetic field element 1a should be located on the shaft 921, from the side opposite to the portion 922. Then, screws or the like are inserted into the magnetic field element 1a from the side opposite to the portion 922, so that the magnetic field element 1a can be sandwiched and fixed between the screws and the portion 922.

When the portions 922 are on both sides of the magnetic field element 1a (FIG. 16), the magnetic field element 1a may, for example, be divided into two parts for the circumferential direction 93. In this case, one and the other parts of the divided magnetic field element 1a are coupled to each other between the two portions 922 while sandwiching the shaft 921 from mutually opposite sides.

When manufacturing a rotary electric machine with the magnetic field element 1a provided with armatures, it is desirable, in terms of preventing a decrease in the efficiency of the rotary electric machine, that the end plates 6 be installed at positions such as not to face windings of the armatures.

Figure 17:
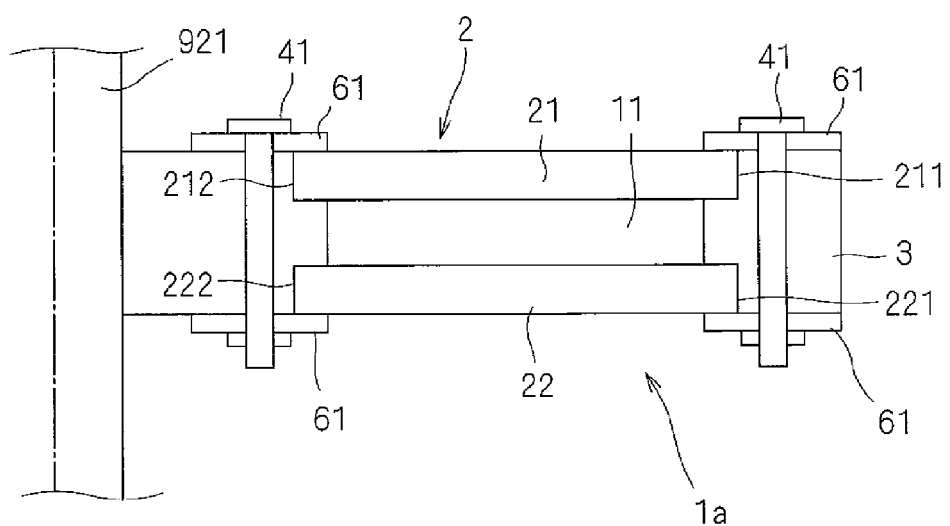

The magnetic plates 21 and 22 may be fixed to the magnets 11 in such a manner as shown in FIG. 17. In other words, the ends 211 and 221 of the magnetic plates 21 and 22 on the outer side may protrude to the outer side relative to the magnets 11. The coupling portion 3 is provided on the outer sides of the magnetic field portions 2. End plates 61 of a non-magnetic material are fixed with pins 41 (or bolts) to both ends, for the given direction 91, of the coupling portion 3 provided on the outer side. The end plates 61 cover at least parts of the end faces of the protruding portions of the magnetic plates 21 on the side opposite to the magnets 11.

Similarly, the inner sides of the magnetic plates 21 and 22 may also be fixed with the end plates 61 (FIG. 17). It is however to be noted that only either one of the inner and the outer sides may be fixed with the end plates 61.

According to the present preferred embodiment, since the end plates 61 cover only the protruding portions of the magnetic plates 21 and 22 and the pins 41 are provided with the coupling portion 3, the end plates 61 and the pins 41 are in such positions as not to face the armatures. This prevents deterioration in magnetic properties and an increase in the gap length between the magnetic field element 1a and the armatures in the rotary electric machine that includes the magnetic field element 1a provided with the armatures.

While the invention has been shown and described in detail, the foregoing description is in all aspects illustrative and not restrictive. It is therefore understood that numerous modifications and variations can be devised without departing from the scope of the invention.

The invention claimed is:

1. A magnetic field element comprising:
    a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;
    magnetic plates provided on at least either of said first and said second pole faces of each of said magnets; and
    a coupling portion made of a non-magnetic material and coupling magnetic field portions to one another, said magnetic field portions including said magnets and said magnetic plates on which said magnets are provided,
    wherein a distance between each adjacent pair of said magnetic field portions along said circumferential direction is shorter than a thickness of said magnets of said magnetic field portions in said parallel directions.

2. The magnetic field element according to claim 1, wherein the coupling portion is made of a non-magnetic metal.

3. A magnetic field element comprising:
    a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;
    magnetic plates provided on at least either of said first and said second pole faces of each of said magnets; and
    a coupling portion made of a non-magnetic material and coupling magnetic field portions to one another, said magnetic field portions including said magnets and said magnetic plates on which said magnets are provided,
    wherein end faces of said magnetic field portions or said parallel directions protrude relative to said coupling portion, and
    wherein the coupling portion is made of a non-magnetic metal.

4. The magnetic field element according to claim 1, wherein the coupling portion is made of a non-magnetic non-metal.

5. The magnetic field element according to claim 1, wherein said magnetic plates are made of an iron-dust core.

6. A magnetic field element comprising:
    a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;
    magnetic plates provided on at least either of said first and said second pole faces of each of said magnets; and
    a coupling portion made of a non-magnetic material and coupling magnetic field portions to one another, said magnetic field portions including said magnets and said magnetic plates on which said magnets are provided, wherein ends of said magnets on an outer side of said magnets protrude to said outer side relative to ends of said magnetic plates on said outer side.

7. A magnetic field element comprising:

a plurality of magnets being arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein ends of said magnets on an inner side of said magnets protrude to said inner side relative to ends of said magnetic plates on said inner side.

8. A magnetic field element comprising:

a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein ends of said magnetic plates on an outer side of said magnetic plates protrude to said outer side relative to ends of said magnets on said outer side.

9. A magnetic field element comprising:

a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein ends of said magnetic plates on an inner side of said magnetic plates protrude to said inner side relative to ends of said magnets on said inner side.

10. A magnetic field element comprising:

a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein said magnets cover at least parts of outer sides or inner sides of said magnetic plates provided on said magnets.

11. A magnetic field element comprising:

a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein said coupling portion couples outer sides of said magnetic field portions to one another, end faces of said magnetic plates on said outer sides are such that at least receding portions of said magnetic plates on a side opposite to said magnets on which said magnetic plates are provided recede inwardly relative to portions of said magnetic plates on a side closer to said magnets, and said coupling portion covers at least parts of the receding portions.

12. A magnetic field element comprising:

a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein said coupling portion couples inner sides of said magnetic field portions to one another;

end faces of said magnetic plates on said inner sides are such that at least receding portions of said magnetic plates on a side opposite to said magnets on which said magnetic plates are provided recede outwardly relative to portions of said magnetic plates on a side closer to said magnet; and said coupling portion covers at least parts of the receding portions.

13. A magnetic field element comprising:

a plurality of magnets being annularly arranged along a circumferential direction around a rotation axis, said magnets being spaced in said circumferential direction from one another and each having first and second pole faces having different polarities from each other arranged in parallel directions perpendicular to a plane representing the circumferential direction;

magnetic plates provided on at least either of said first and said second pole faces of each of said magnets; and a coupling portion made of a non-magnetic material and coupling magnetic field portions to one another, said magnetic field portions including said magnets and said magnetic plates on which said magnets are provided, wherein said magnetic plates are provided on both said first and second pole faces, and wherein said magnetic plates provided on said first and said second pole faces of one of said magnets are coupled to each other on an outer side and on an inner side of the magnet.

14. The magnetic field element according to claim 3, wherein said magnetic plates are made of an iron-dust core.

* * * * *